(12) United States Patent
Morgan et al.

(10) Patent No.: US 11,371,466 B2
(45) Date of Patent: Jun. 28, 2022

(54) PISTON FOR INTERNAL COMBUSTION ENGINE HAVING VALVE POCKET STEP FOR SLOWING COMBUSTION GAS FLOW

(71) Applicant: Caterpillar Inc., Peoria, IL (US)

(72) Inventors: Bradley Morgan, Chillicothe, IL (US); Jeffrey Clark Krieger, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 100 days.

(21) Appl. No.: 16/717,536

(22) Filed: Dec. 17, 2019

(65) Prior Publication Data
US 2021/0180540 A1    Jun. 17, 2021

(51) Int. Cl.
| | |
|---|---|
| F02B 23/00 | (2006.01) |
| F02F 3/28 | (2006.01) |
| F01L 3/20 | (2006.01) |
| F01L 3/22 | (2006.01) |
| F02F 1/00 | (2006.01) |
| F02F 1/24 | (2006.01) |
| F02F 1/42 | (2006.01) |
| F02F 3/26 | (2006.01) |
| F02M 61/14 | (2006.01) |
| F16J 1/00 | (2006.01) |

(52) U.S. Cl.
CPC ...... *F02F 3/28* (2013.01); *F01L 3/20* (2013.01); *F01L 3/22* (2013.01); *F02F 1/004* (2013.01); *F02F 1/242* (2013.01); *F02F 1/4264* (2013.01); *F02F 3/26* (2013.01); *F02M 61/14* (2013.01); *F16J 1/005* (2013.01); *F02F 2001/247* (2013.01)

(58) Field of Classification Search
CPC .................. F02F 3/26; F02F 3/28; F02F 3/00
USPC .............................. 123/193.6, 307, 73 F, 269
See application file for complete search history.

(56) References Cited

U.S. PATENT DOCUMENTS

| | | | | |
|---|---|---|---|---|
| 4,745,891 | A | * | 5/1988 | Cola ........................ F02F 1/242 |
| | | | | 123/193.6 |
| 4,785,776 | A | * | 11/1988 | Tokura ................ F02B 23/0639 |
| | | | | 123/269 |
| 4,881,501 | A | * | 11/1989 | Shinzawa ........... F02B 23/0639 |
| | | | | 123/279 |
| 5,309,879 | A | * | 5/1994 | Regueiro ................ F02B 19/14 |
| | | | | 123/286 |
| 8,677,970 | B2 | | 3/2014 | Venugopal et al. |
| 9,267,421 | B2 | * | 2/2016 | Toda ........................ F02F 3/24 |
| 10,233,865 | B2 | | 3/2019 | Prstojevic et al. |

(Continued)

FOREIGN PATENT DOCUMENTS

| | | |
|---|---|---|
| DE | 102017221527 A1 | 6/2019 |
| EP | 0849448 | 6/1998 |

(Continued)

*Primary Examiner* — George C Jin
*Assistant Examiner* — Teuta B Holbrook
(74) *Attorney, Agent, or Firm* — Brannon Sowers & Cracraft

(57) ABSTRACT

A piston for an internal combustion engine includes a plurality of valve pockets formed in a piston rim, the valve pockets forming fluid flow paths through the piston rim. Each of the valve pockets includes a central step standing proud of a pocket floor to limit a fluid flow area through the pocket and slow combustion gas flow from a combustion bowl toward a cylinder liner and thereby reduce displacement of an engine oil film thereon.

20 Claims, 7 Drawing Sheets

(56) References Cited

U.S. PATENT DOCUMENTS

| | | | | |
|---|---|---|---|---|
| 10,975,799 B2* | 4/2021 | Renner | ................ | F02B 29/086 |
| 2007/0056556 A1* | 3/2007 | Yohso | ................... | F02B 31/085 |
| | | | | 123/308 |
| 2008/0135007 A1* | 6/2008 | Storm | .................... | F02B 23/08 |
| | | | | 123/143 C |
| 2008/0276900 A1* | 11/2008 | Umierski | ............. | F02B 23/101 |
| | | | | 123/193.6 |
| 2010/0059016 A1* | 3/2010 | Tachibana | ............ | F02B 31/085 |
| | | | | 123/307 |
| 2013/0319372 A1 | 12/2013 | Gladden et al. | | |
| 2014/0026840 A1* | 1/2014 | Okada | .................... | F02B 23/08 |
| | | | | 123/193.6 |
| 2016/0138461 A1 | 5/2016 | Ono | | |
| 2016/0265417 A1* | 9/2016 | Ono | ................... | F02B 23/0645 |
| 2019/0107077 A1* | 4/2019 | Renner | ..................... | F01L 3/22 |
| 2020/0166003 A1* | 5/2020 | Imamura | ............ | F02D 41/3818 |

FOREIGN PATENT DOCUMENTS

| | | | |
|---|---|---|---|
| GB | 1012004 A | | 12/1965 |
| JP | 07243327 A | * | 9/1995 |
| JP | 4552895 B2 | | 9/2010 |

* cited by examiner

PISTON FOR INTERNAL COMBUSTION ENGINE HAVING VALVE POCKET STEP FOR SLOWING COMBUSTION GAS FLOW

TECHNICAL FIELD

The present disclosure relates generally to a piston for an internal combustion engine, and more particularly to valve pockets in a piston rim structured to slow combustion gas flow from a combustion bowl toward a cylinder liner.

BACKGROUND

A great variety of operating strategies and component geometries are known in the field of internal combustion engines. Engineers have experimented for decades with different ways to operate fueling, exhaust, intake, and other engine systems as well as variations in shaping and proportioning engine components to various ends. One motivation behind such experimentation has been balancing the often competing interests of reducing certain emissions in exhaust from the engine, and optimizing efficiency. Combustion of fuel and air in an internal combustion engine produces exhaust including a variety of compounds such as soot, ash, unburned hydrocarbons, water, carbon dioxide, and carbon monoxide, and other organic and inorganic species.

Certain internal combustion engine configurations seek to tightly control functional and spatial relationships between components at various points during an engine cycle. When a piston is positioned at a top dead center position in an engine cycle, for instance, a volume, known generally as the "squish" extends between the top land of the piston rim and the fireside surface of the engine head. For various reasons, the volume of the squish in engines is desirably quite small. Since the piston can approach engine valves at the top dead center position, and in some instances, by design or otherwise, risks colliding with engine valves at the top dead center position, some pistons are formed with valve pockets in the piston rim. Valve pockets can accommodate engine valves that are open, or partially open, at the top dead center position of the piston without risk of actual collision. Since the presence or absence of valve pockets, as well as the specific valve pocket configurations, can affect factors such as geometric compression ratio and squish volume, variations in piston design around or affecting valve pocket geometry can sometimes have outsized effects on engine performance or emissions, or the effects can be quite unpredictable. One known piston having valve pockets is set forth in United States Patent Application Publication No. 2013/0319372A1 to Gladden et al.

SUMMARY OF THE INVENTION

In one aspect, an engine includes a cylinder block having a cylinder liner positioned therein and forming a combustion cylinder. The engine further includes a cylinder head having a gas exchange conduit formed therein, and a fuel injector supported in the cylinder head and including fuel spray orifices positioned within the combustion cylinder. The engine further includes an engine valve supported for reciprocation in the cylinder head and movable from a closed position to an open position to fluidly connect the gas exchange conduit to the combustion cylinder. A piston is positioned in the combustion cylinder and movable between a bottom dead center position and a top dead center position to increase a fluid pressure in the combustion cylinder to an autoignition threshold. The piston includes a piston crown having a bowl surface forming a combustion bowl and a piston rim positioned radially outward of the combustion bowl and extending circumferentially around a piston center axis. A valve pocket is formed in the piston rim and positioned to receive the engine valve when the engine valve is at the open position. The valve pocket forms a fluid flow path through the piston rim and includes a valve pocket floor, and a central step standing proud of the valve pocket floor and positioned in the fluid flow path to slow combustion gas flow from the combustion bowl toward the cylinder liner.

In another aspect, a piston for an internal combustion engine includes a piston body having a piston skirt, and a piston crown attached to the piston skirt. The piston crown has a bowl surface forming a combustion bowl, and a piston rim positioned radially outward of the combustion bowl and extending circumferentially around a piston center axis and radially between the combustion bowl and a piston crown outer peripheral surface. A plurality of valve pockets are formed in the piston rim. The plurality of valve pockets form fluid flow paths through the piston rim, and each includes a valve pocket floor, valve pocket walls extending between the combustion bowl and the outer peripheral surface, and a central step. The central step stands proud of the valve pocket floor to limit a fluid flow area of the respective fluid flow path and includes an inner step wall, and an outer step wall spaced from the valve pocket walls and from the piston crown outer peripheral surface.

In still another aspect, a piston crown for a piston in an internal combustion engine includes a piston crown body defining a piston center axis extending between a first piston crown axial end, and a second piston crown axial end including a combustion face. The combustion face includes a bowl surface forming a combustion bowl, and a piston rim positioned radially outward of the combustion bowl and extending circumferentially around the piston center axis and radially between the combustion bowl and a piston crown outer peripheral surface. A plurality of valve pockets are formed in the piston rim and distributed circumferentially around the piston center axis, to receive a plurality of engine valves in the internal combustion engine. The plurality of valve pockets form fluid flow paths through the piston rim, and each includes a valve pocket floor, and valve pocket walls extending between the combustion bowl and the outer peripheral surface. At least one of the plurality of valve pockets further includes a central step structured to limit a fluid flow area of the respective fluid flow path. The central step stands proud of the valve pocket floor and includes a step top surface recessed relative to the piston rim. The central step further includes an inner step wall adjacent to the combustion bowl, and an outer step wall spaced from the valve pocket walls and from the piston crown outer peripheral surface.

DETAILED DESCRIPTION

Figure 1:
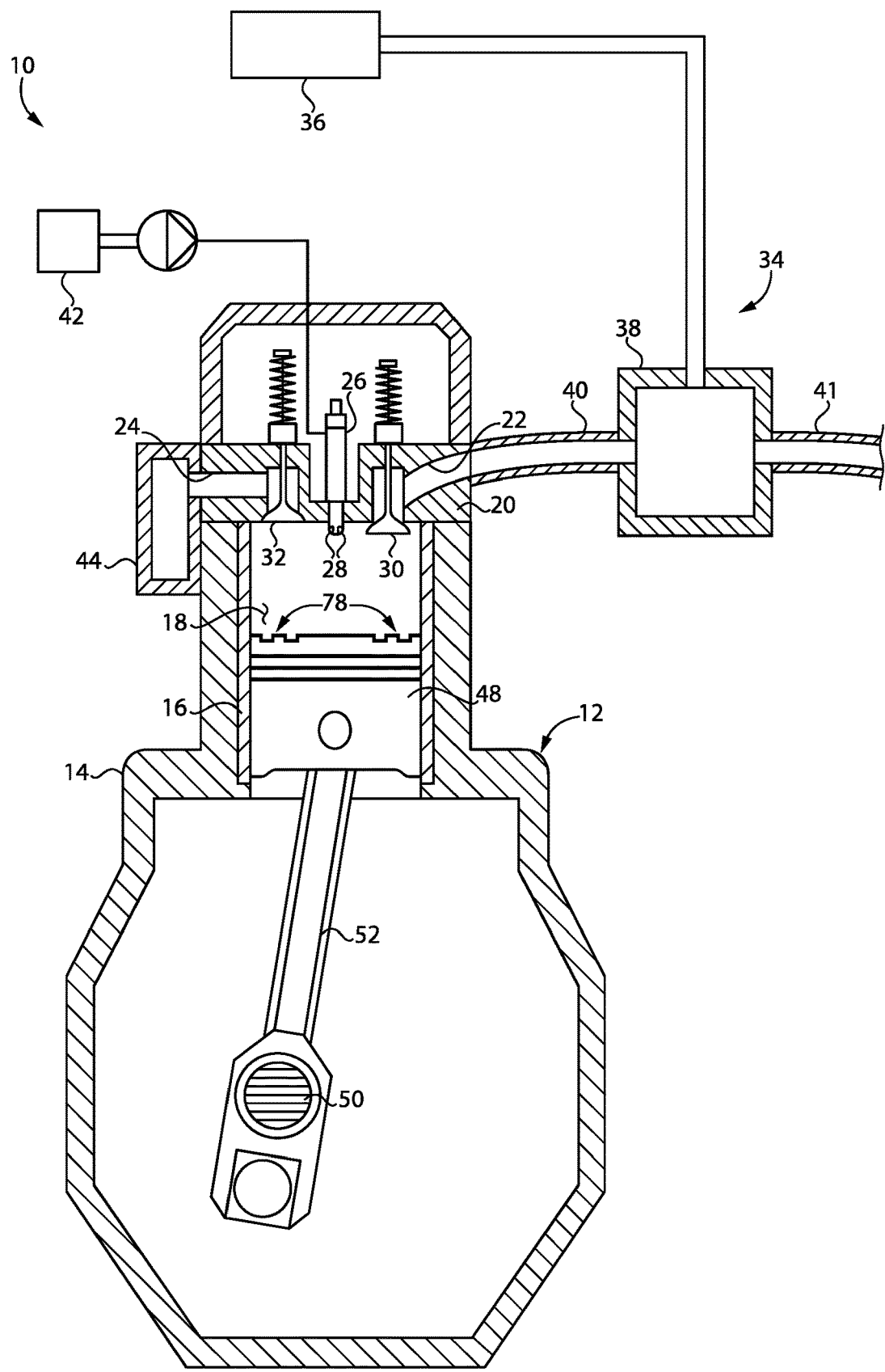
FIG. 1 is a partially sectioned diagrammatic view of an internal combustion engine system, according to one embodiment.

Referring to FIG. 1 there is shown an internal combustion engine system 10, according to one embodiment. Internal combustion engine system 10 includes an engine 12 having a cylinder block 14 with a cylinder liner 16 positioned therein and forming a combustion cylinder 18. Engine 12 also includes a cylinder head 20 having a plurality of gas exchange conduits 22 and 24 formed therein. Gas exchange conduit 22 and gas exchange conduit 24 could each include an exhaust conduit, each include an intake conduit, or be one of each. In the illustrated embodiment, gas exchange conduit 22 is an intake conduit, and gas exchange conduit 24 is an exhaust conduit. A fuel injector 26 is supported in cylinder head 20 and includes fuel spray orifices 28 positioned within combustion cylinder 18 for direct fuel injection.

In a practical implementation strategy, engine 12 includes a compression ignition diesel engine, where cylinder liner 16 is one of a plurality of cylinder liners forming a plurality of combustion cylinders, in any suitable arrangement. Accordingly, description herein of combustion cylinder 18 in the singular, and components associated with combustion cylinder 18 in the singular, will be understood by way of analogy to refer to any of a plurality of combustion cylinders or associated components that might be provided in engine 12. Engine system 10 also includes an intake system 34 including an intake air inlet 36 structured to convey intake air to an intake manifold 38. Engine system 10 may be turbocharged, and could include conventional turbocharger equipment not illustrated in FIG. 1. A first intake runner 40 extends from intake manifold 38 to gas exchange conduit 22, and a second intake runner 41 is shown also extending from intake manifold 38 and will be understood to connect to another gas exchange conduit and combustion cylinder in engine 12. An exhaust conduit is shown at 44 and structured to receive exhaust from gas exchange conduit 24, supplying the exhaust to an exhaust manifold 44.

Engine 12 also includes a first engine valve 30 and a second engine valve 32 supported for reciprocation in cylinder head 20 and each movable from a closed position to an open position to fluidly connect the respective gas exchange conduits 22 and 24 to combustion cylinder 18. A piston 48 is shown positioned in combustion cylinder 18 and is movable between a bottom dead center position, approximately as shown, and a top dead center position to increase a fluid pressure in combustion cylinder 18 to an autoignition threshold. Piston 48 includes valve pockets 78 formed therein and structured to slow combustion gas flow toward cylinder liner 16, to limit displacement of an oil film upon an inner wall of cylinder liner 16 and consequent undesired transfer of heat into material of cylinder liner 16, as further discussed herein.

Figure 2:
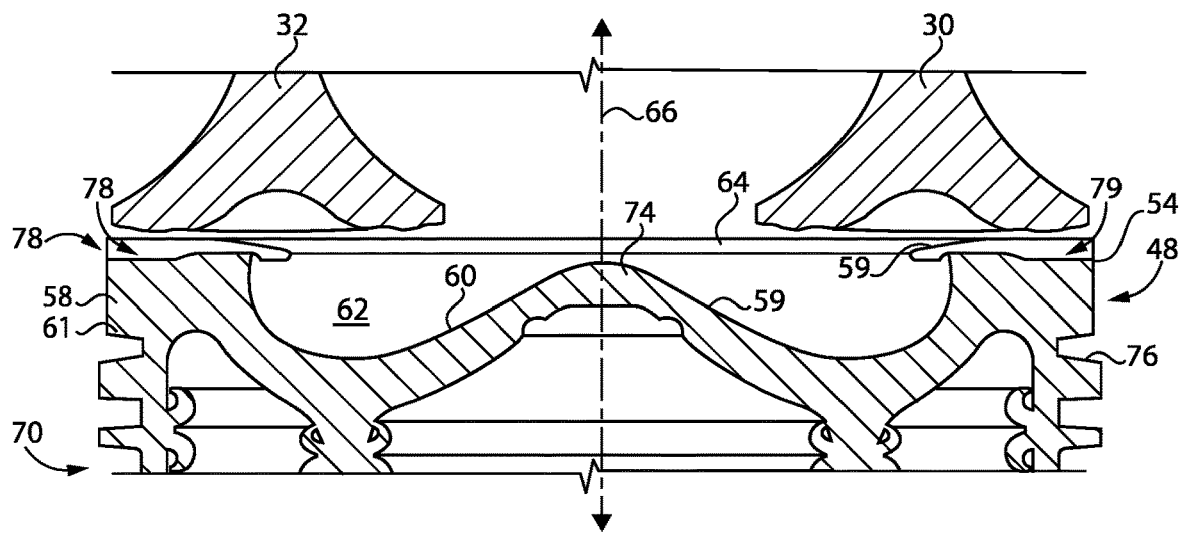
FIG. 2 is a sectioned side diagrammatic view through a portion of an internal combustion engine, according to one embodiment.
Figure 3:
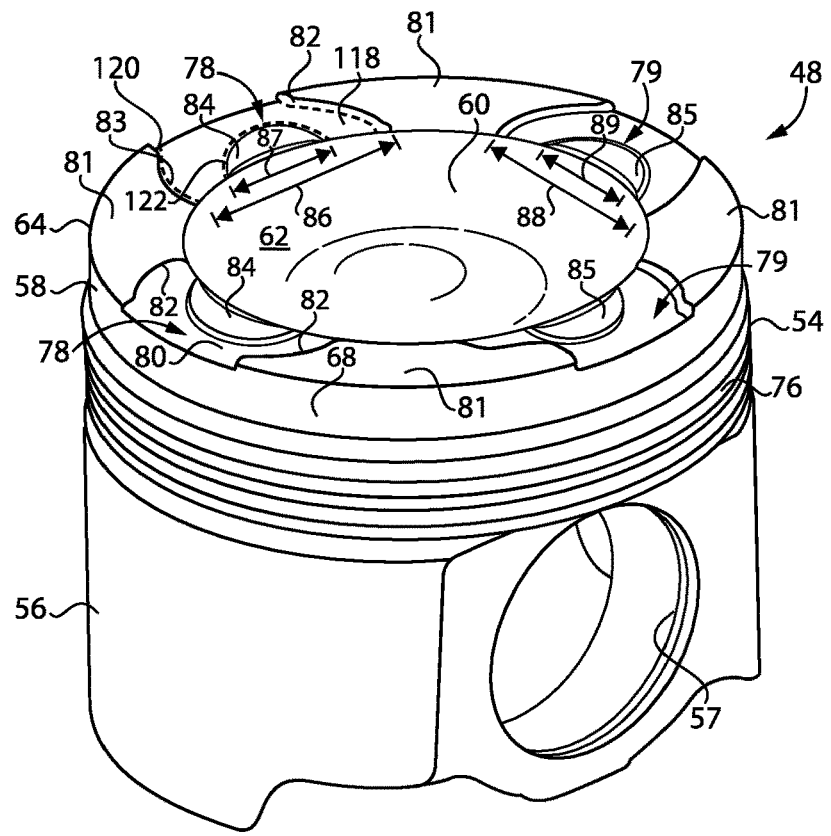
FIG. 3 is a perspective view of a piston, according to one embodiment.
Figure 4:
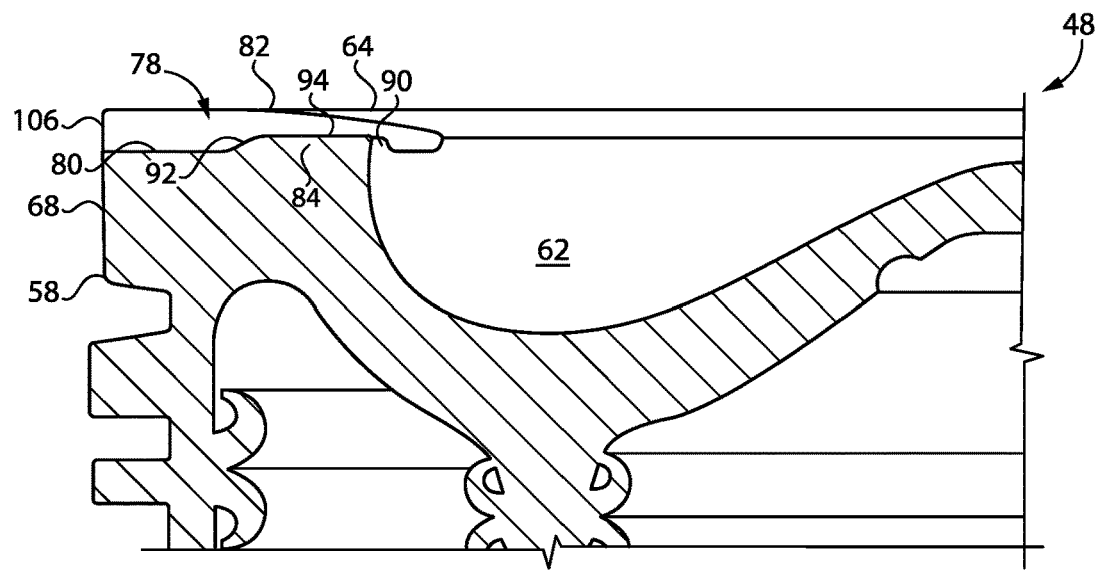
FIG. 4 is a sectioned view through a portion of the piston of FIG. 3.

Referring now also to FIGS. 2-4, there are shown features of engine system 10 and piston 48 in further detail. Piston 48 includes a piston body 54 having a piston skirt 56, with a wrist pin bore 57 formed therein. Wrist pin bore 57 is structured to receive a wrist pin to couple piston 48 to a crankshaft 50 by way of a connecting rod 52 as illustrated in FIG. 1. Piston body 54 also includes a piston crown 58 including a crown body 61 attached to piston skirt 56. Piston crown body 61 of piston crown 58 defines a piston center axis 66 extending between a first piston crown axial end 70 attached, such as by friction welding, to piston skirt 56, and a second piston crown axial end 72 that includes a combustion face 59. Combustion face 59 includes a bowl surface 60 forming a combustion bowl 62, and a piston rim 64 positioned radially outward of combustion bowl 62 and extending circumferentially around piston center axis 66. Piston rim 64 also extends radially between combustion bowl 62 and a piston crown outer peripheral surface 68. A plurality of valve pockets 78 and 79 are formed in piston rim 64 and structured to receive a plurality of engine valves 32 and 30 in engine 12. Piston 48 also includes a center cone 74 formed by bowl surface 60, and a plurality of ring grooves 76 formed in piston crown outer peripheral surface 68. A plurality of separate top land areas 81 of piston rim 64 are in an alternating arrangement with valve pockets 78 and 79, which may be distributed circumferentially around piston center axis 66.

In the illustrated embodiment, valve pockets 78 include intake valve pockets, and valve pockets 79 include exhaust valve pockets. Embodiments are contemplated where intake valve pockets and exhaust valve pockets are identical in a piston, however, in other embodiments there may be certain differences between the intake valve pockets and the exhaust valve pockets, or even potentially between intake valve pockets or between exhaust valve pockets. Valve pockets 78 and 79 form fluid flow paths through piston rim 64. It will thus be understood that description and discussion herein of any one valve pocket, or features thereof, should be understood to refer by way of analogy to any other valve pocket except where otherwise indicated or apparent from the context. Each of valve pockets 78 includes a valve pocket floor 80, valve pocket walls 82 extending between combustion bowl 62 and outer peripheral surface 68, and a central step 84. Valve pockets 79 will be understood analogously to include valve pocket walls and a valve pocket floor (not numbered), and each includes a central step 85. Each of central step 84 and central step 85 stands proud of the respective pocket floor 80 to limit, and aerodynamically influence, a fluid flow area of the respective fluid flow path according to principals further discussed herein. The effects on the fluid flow area can assist in slowing combustion gas flow from combustion bowl 62 toward cylinder liner 16.

Referring also now to FIG. 4, central step 84 includes an inner step wall 90 adjacent to combustion bowl 62, and an outer step wall 92 spaced from pocket walls 82 and from outer peripheral surface 68. Central step 84 further includes a step top surface 94 recessed, in an axial direction, relative to piston rim 64, in particular top land areas 81. As best depicted in FIG. 4, piston rim 64 may have a curved profile rising upwardly, relative to pocket floor 80, in a direction of outer peripheral surface 68, upon top land area 81. Accordingly, step top surface 94 might not be recessed relative to all of piston rim 64, but will typically be recessed relative to top land area 81 at least at regions radially outward of combustion bowl 62.

It will be recalled that valve pockets 78 and valve pockets 79 might be identical, but may be different in some embodiments. With continued reference to FIG. 3, piston configurations are contemplated according to the present disclosure where a plurality of valve pockets in a piston, including a first valve pocket and a second valve pocket, are structured such that each of a pocket width and a central step width of the first valve pocket is greater than a pocket width and a central step width of the second valve pocket. In FIG. 3, a first pocket width, of one of valve pockets 78, is shown at 86. A second valve pocket width, of one of valve pockets 79, is shown at 88. A first step width, of one of valve pockets 78, is shown at 87. A second step width, of one of valve pockets 79, is shown at 89. Although differences in dimensions may be relatively minor, such as differing by about 5 millimeters or less, different functionality for associated intake and exhaust gas exchange conduits can be achieved with the different dimensions and/or differences in exhaust valves versus intake valves accommodated. In one example embodiment, pocket width 86 where valve pocket 78 is an intake valve, may be larger than pocket width 88 where valve pocket 79 is an exhaust valve. Analogously, step width 87 might be larger than step width 89. Those skilled in the art will appreciate the possibility of still other variations between and among intake valve pockets and exhaust valve pockets in view of the present disclosure.

Figure 5:
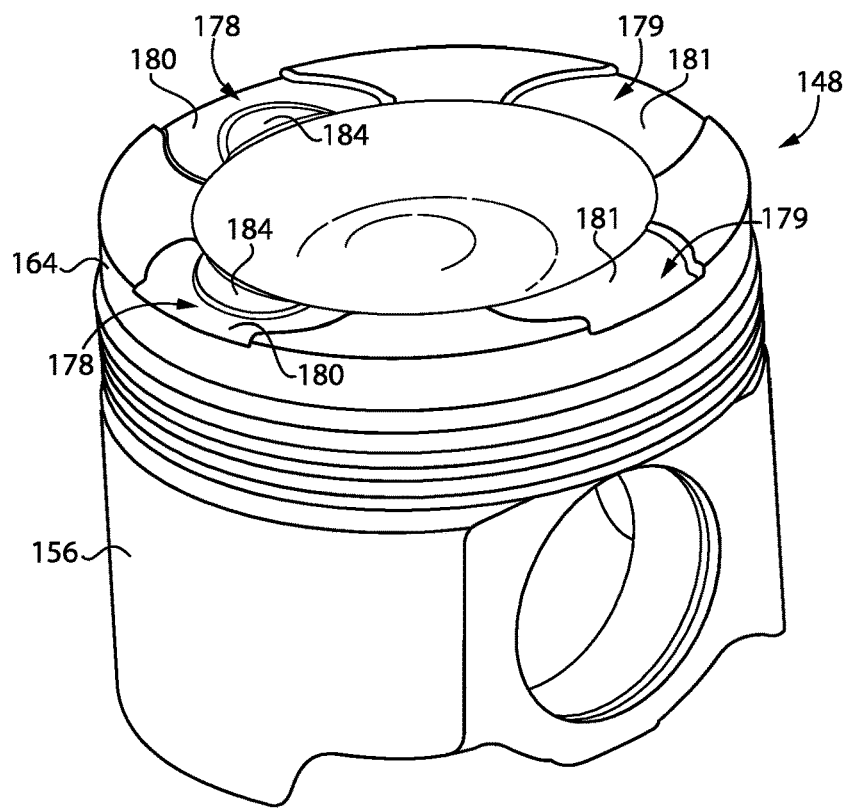
FIG. 5 is a perspective view of a piston, according to another embodiment.

Referring now to FIG. 5, there is shown a piston 148 according to another embodiment and having certain similarities with piston 48, but also certain differences. Piston 148 includes a piston skirt 156, and a piston rim 164 with two valve pockets 178, and another two valve pockets 179, formed therein. Valve pockets 178 each include a pocket floor 180 and a central step 184. Each of valve pockets 179 includes a pocket floor 181, but no central step. In other words, valve pockets 179 may be stepless. Pocket floor 180 may be planar, interrupted by central step 184. Pocket floor 181 may be uniformly planar and uninterrupted. Other embodiments could include a total of two valve pockets, where one valve pocket having a central step is formed in the piston rim, and one stepless valve pocket is also formed in the piston rim. Piston 148 is understood to have two stepless valve pockets in the illustrated embodiment. The stepless valve pockets 179 might be exhaust valve pockets, and the stepped valve pockets 178 might be intake valve pockets, however, the present disclosure is not thereby limited and an opposite arrangement could be used.

Figure 6:
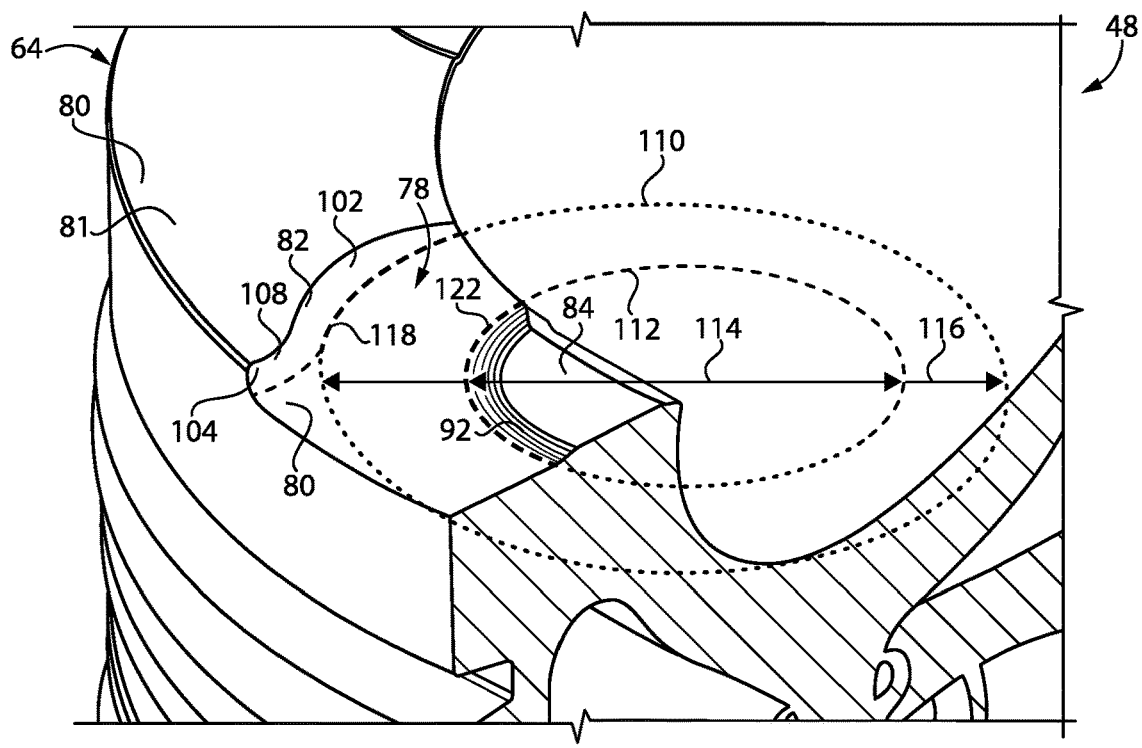
FIG. 6 is a sectioned view, in perspective, through a portion of the piston of FIGS. 3 and 4.

Referring again to FIGS. 2-4 and now also to FIG. 6 showing additional details of a valve pocket 78, valve pocket 78 may further include a first pocket wall 82 and a second pocket wall 83 having mirror image contours, about a radius line of a circle defined by piston center axis 66. The mirror image contours may each be formed by a radially inward concave wall segment 102 and a radially outward wall segment 104. The radially outward wall segment 104 may be convex, and two radially outward wall segments 104 may together form a throat 106 opening at outer peripheral surface 68. A radiused transition 108 is shown approximately where concave inner wall segment 102 transitions with outer wall segment 104. First pocket wall 82 and second pocket wall 83 may further define an outer circle 110. Central step 84 further includes an outer step wall 92, defining an inner circle 112 that is concentric with outer circle 110. It can further be noted, as best shown in FIG. 6, that pocket walls 82 and 83 have a relatively smooth curvilinear transition with pocket floor 80, and a relatively sharper transition with top land area 81. First pocket wall 82 may intersect pocket floor 80 at a first contour line 118 as shown in FIGS. 3 and 6. Second pocket wall 83, not visible in FIG. 6 but illustrated in FIG. 3, intersects pocket floor 80 at a second contour line 120. Outer step wall 92 intersects pocket floor 80 at a third contour line 122. First contour line 118 and second contour line 120 form arc segments of outer circle 110. Third contour line 122 forms an arc segment of inner circle 112.

It has been discovered that desirable advantageous fluid flow characteristics, including slowing of combustion gas flow without unduly obstructing it through the fluid flow path formed by valve pocket 78, and other valve pockets discussed herein, can be obtained where ratios of certain features of the valve pockets and central steps are within general ranges. In one implementation, a diameter 114 of inner circle 112 is from about 39% to about 80% of a diameter 116 of outer circle 110. In the embodiment of FIG. 6, including where pocket floor 80 is planar from third contour line 122 to each of first contour line 118 and second contour line 120, diameter 114 of inner circle 112 may be from 60% to 64% of diameter 116 of outer circle 110. In one specific example, diameter 116 may be about 45 millimeters, more particularly about 44.5 millimeters. Diameter 114 may be about 27 millimeters, more particularly about 27.0 millimeters. In another specific example, diameter 116 may be 47 millimeters, more particularly about 47.0 millimeters, and diameter 144 may be about 30 millimeters, more particularly 30.0 millimeters. The first specific example could be an exhaust valve, and the second an intake valve. In other embodiments, discussed below, the same general ratio has been found to be desirable.

Figure 7:
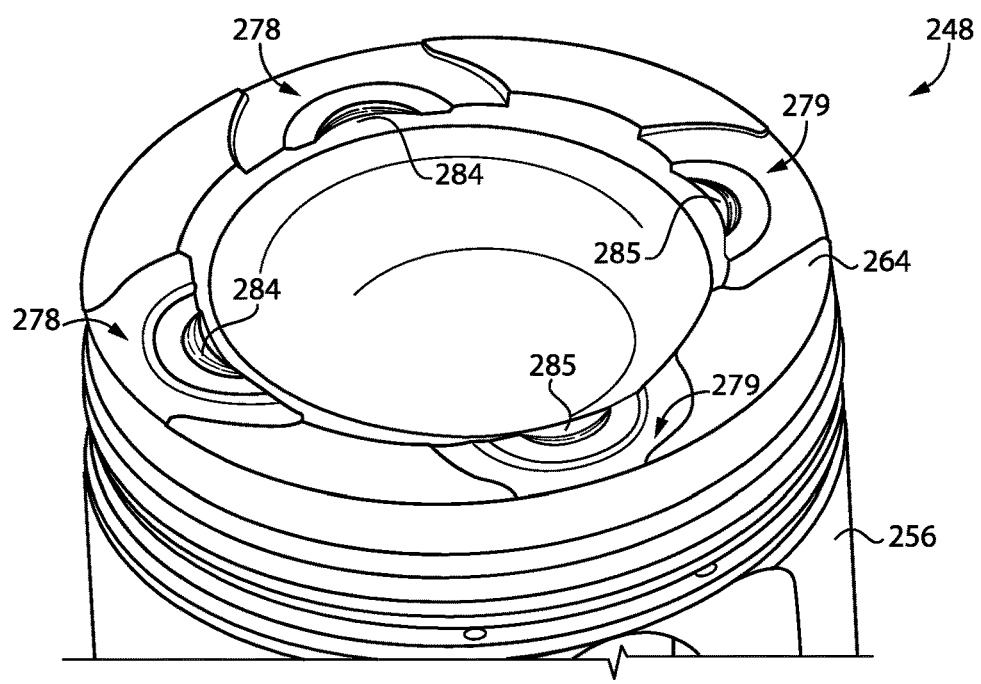
FIG. 7 is a perspective view of a piston, according to another embodiment.
Figure 8:
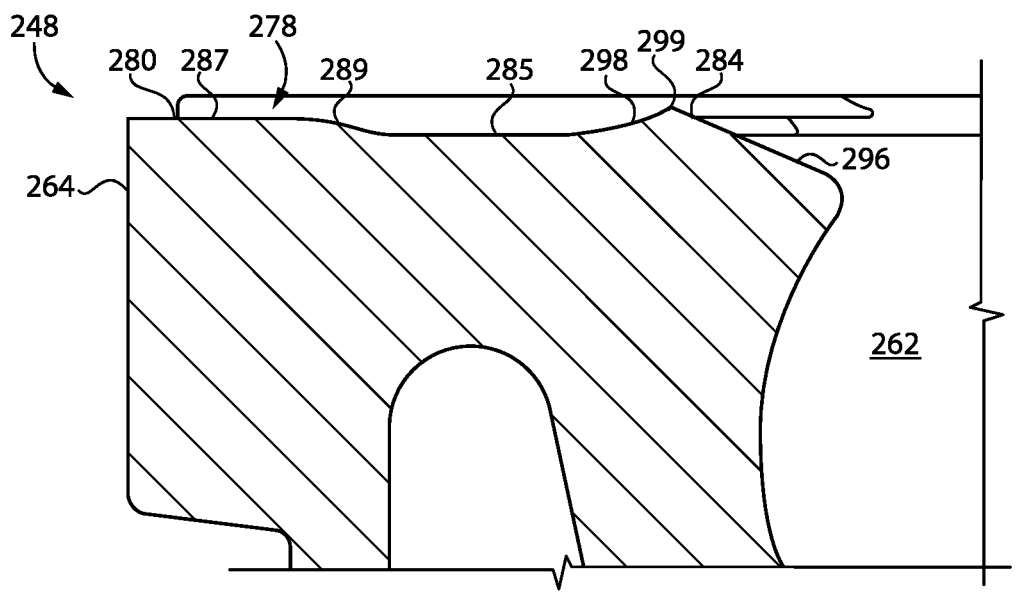
FIG. 8 is a sectioned view through a portion of the piston of FIG. 7.
Figure 9:
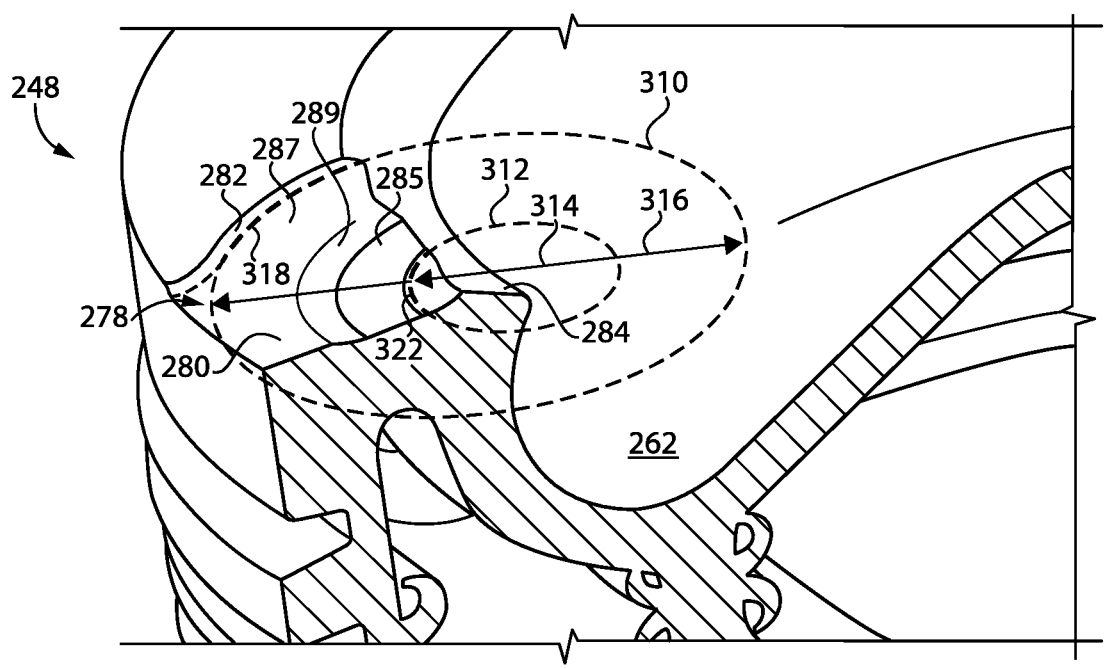
FIG. 9 is a sectioned view, in perspective, through a portion of the piston of FIGS. 7 and 8.

Referring now to FIGS. 7-9, there is shown a piston 248 according to another embodiment. Piston 248 has a number of similarities with the embodiments discussed above, and several differences. Piston 248 includes a piston skirt 256, and a piston crown 258 including a piston rim 264. Two valve pockets 278 are formed in piston rim 264, and may include intake valve pockets, each having a central step 284. Two additional valve pockets 279 are formed in piston rim 264, and may include exhaust valve pockets, each having a central step 285. Whereas in the embodiments discussed above the valve pocket floor may be uniformly planar but for the central step, in the embodiment of FIGS. 6-9 a valve pocket floor 280 may have a different configuration, such as to accommodate a different shaped engine valve as further discussed herein.

As illustrated in FIG. 9, valve pocket 278 includes pocket walls 282 (one shown in FIG. 9) defining an outer circle 310, with central step 284 having an outer step wall, referred to below as a descending slope 298, defining an inner circle 312. Pocket walls 282 intersect pocket floor 280 at a contour line 318, and step wall/slope 298 intersects pocket floor 280 at a contour line 322. Contour line 318 and 322 form arc segments of outer circle 310 and inner circle 312, respectively, generally analogous to embodiments discussed above. Outer circle 310 has a diameter 316, inner circle 312 has a diameter 314. Outer circle 310 and inner circle 312 may be concentric. Diameter 314 may be from about 39% to about 80% of diameter 316. More particularly, diameter 314 may be from 39% to 43% of diameter 316. Whereas in the embodiment of FIGS. 2-4 and 6, and in the embodiment of FIG. 5, the valve pocket floor may be planar from the third contour line to each of the first contour line and the second contour line, in piston 248 pocket floor 280 includes an inner planar region 285 bounded by third contour line 322, an outer planar region 287 bounded by first contour line 318 (and an analogously defined contour line of the pocket wall not shown in FIG. 9), and a downward sloping region 289 extending between the inner planar region 285 and the outer planar region 287. A profile of valve pocket 278 may be such that an ascending slope 296 extends from a combustion bowl 262 in a radially outward direction to a crest 299, and descending slope 298 extends radially outward from crest 299 to inner planar region 285. Other features of valve pocket 278, and also valve pocket 279, may be generally similar or identical to those of valve pocket 278 and other valve pockets discussed above, including contours of pocket walls 282 and the mirror image relationship of the pocket walls.

In one specific example, diameter 316 may be about 48 millimeters, more particularly about 47.5 millimeters. Diameter 314 may be about 19 millimeters, more particularly about 18.7 millimeters. In another specific example, diameter 316 may be about 50 millimeters, more particularly about 50.0 millimeters, and diameter 314 may be about 29 millimeters, more particularly about 20.8 millimeters. The first specific example could be an exhaust valve, and the second an intake valve. Where the term "about" is used, the quantity of interest may be understood as generally or approximately equal to the listed value, for instance by conventionally rounding such that "about 18.7" means from 18.65 to 18.74, within measurement error. In other instances the term "about" could have a broader or different meaning than that of conventional rounding depending upon the context. Where the term "about" is not used, the quantity may be understood as equal to the listed value, within measurement error.

Figure 10:
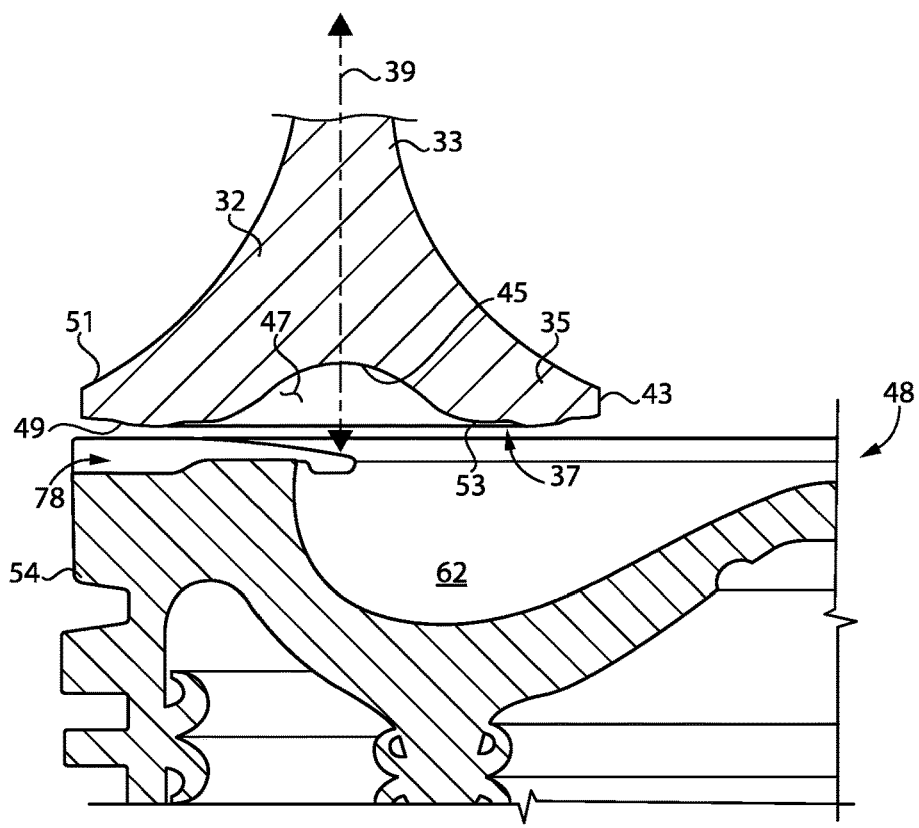
FIG. 10 is a sectioned side diagrammatic view through portions of a piston and engine valve, according to one embodiment.

Referring now to FIG. 10, there is shown engine valve 32 in proximity to piston 48. Engine valve 32 includes certain features cooperating with features of piston 48. Engine valve 32 includes a valve stem 33 and an attached valve head 35. Valve head 35 includes a valve combustion surface 37. An outer peripheral surface 43 of valve head 35 extends circumferentially around a valve center axis 39. Valve head 35 also includes a concave arcuate surface 45 extending circumferentially around valve center axis 39 and forming a centrally located dimple 47. A seating surface 51 is located generally opposite to valve combustion surface 37. Seating surface 51 may be conical and structured to mate with a valve seat formed, for example, in a valve seat insert. A middle surface 53 extends circumferentially around concave arcuate surface 45 and may be planar or conical, for example. Valve head 35 also includes a raised ring 49. In the illustrated embodiment raised ring 49 is positioned radially between concave arcuate surface 45 and outer peripheral surface 43, centered upon and extending circumferentially around valve center axis 39. Raised ring 49 is radially outward of middle surface 53. Embodiments are contemplated where a valve combustion surface is uniformly planar. In engine valve 32, however, extra material as formed by raised ring 49 extends axially outward upon valve combustion surface 37, and can assist in obtaining desirable thermal fatigue life properties of engine valve 32. The extra material of raised ring 49 can be received within valve pocket 78 at the top dead center position of piston 48 in at least some embodiments.

Figure 11:
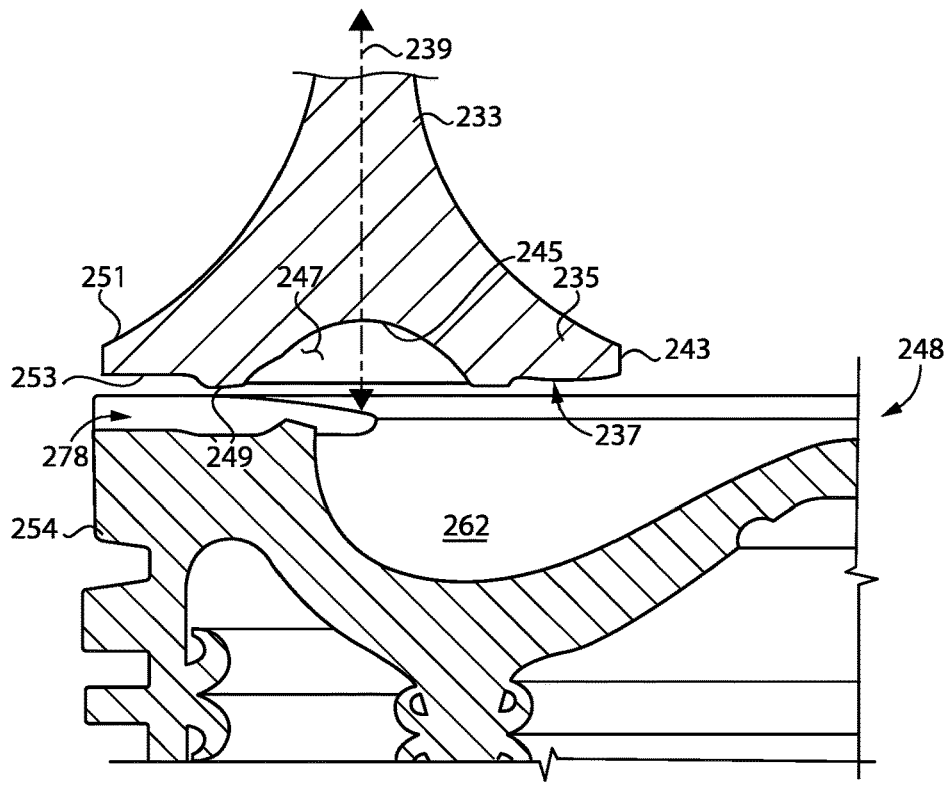
FIG. 11 is a sectioned side diagrammatic view through portions of a piston and engine valve, according to another embodiment.

Referring now to FIG. 11, there is shown an engine valve 233 in proximity to piston 248. Engine valve 233 includes certain features cooperating with features of piston 448, and has a valve stem 233 and an attached valve head 235. Valve head 35 includes a combustion surface 237, and an outer peripheral surface 43 extending circumferentially around a valve center axis 239. Valve head 235 also includes a concave arcuate surface 245 extending circumferentially around valve center axis 239 and forming a centrally located dimple 247. A seating surface 251 is located generally opposite to valve combustion surface 237, and may be conical and structured to mate with a valve seat formed, for example, in a valve seat insert 253. A radially outward surface 253 extends circumferentially around valve center axis 239, adjacent to outer peripheral surface 243, and may be planar, for example. Valve head 235 also includes a raised ring 249 in part forming combustion surface 237. In the illustrated embodiment, raised ring 249 adjoins arcuate surface 245. Raised ring 49 and raised ring 249, in the respective FIG. 10 and FIG. 11 embodiments, can have a rounded cross-sectional shape, a flat or plateau shape, or still another shape, and can be positioned adjacent to a centrally located dimple (if present), adjacent an outer peripheral valve head surface, or between these locations.

INDUSTRIAL APPLICABILITY

Figure 12:
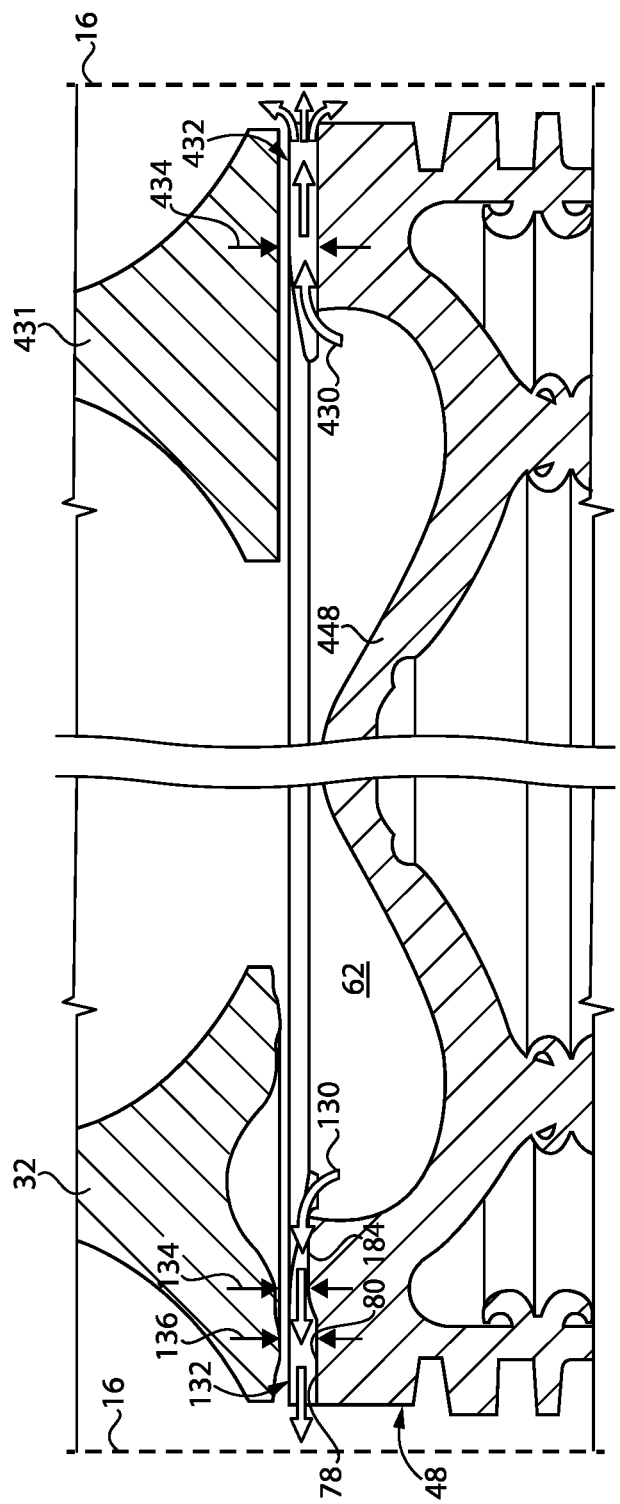
FIG. 12 is a comparative diagram of an internal combustion engine, according to one embodiment, shown in comparison to a known engine configuration.

Referring to the drawings generally, but in particular now to FIG. 12, there is shown on the lefthand side example combustion gas flow via arrows 130 across piston 48 in engine 12 as it might appear where piston 48 is at a top dead center position, in comparison to example combustion gas flow via arrows 430 on the righthand side across a conventional piston 448 in an engine according to a known design, also as it might appear at a top dead center position. During engine operation, fuel may be injected at relatively high pressures including up to several hundred megapascals (MPa). Depending upon not only injection pressure but also factors such as compression ratio, injection spray angle, injection timing, and still other factors, it has been observed that plumes of combusting fuel and air and combustion products, and potentially other gases such as recirculated exhaust gas, can impinge upon a cylinder liner in a manner that displaces and/or evaporates an oil film upon the inner wall of the cylinder liner. As a result, the loss of cooling and lubricating effects of the oil at these focused locations can result in damage or degradation or poor appearance of the cylinder liner.

It can be seen from the comparative illustration of FIG. 12 that combustion gas flow 430 will pass generally unobstructed through a squish 432 between an engine valve 431 and piston 448, allowing the combustion gases to impinge at a relatively high velocity upon an inner wall of cylinder liner 16. A squish height associated with piston 448 is shown at 434, and is generally uniform throughout, resulting in combustion gas velocities that can be sufficient to unduly displace an oil film. In contrast, in the case of piston 48 a squish is shown at 132, and it can be noted that a relatively lesser squish height 134 is formed between engine valve 32 and central step 184, but a relatively greater squish height 136 is formed between engine valve 32 and pocket floor 80.

Combustion of air and fuel in a compression-ignition internal combustion engine is a severe and highly dynamic process, with temperatures above 400° C. and even exceeding 600° C., rapid changes in temperature, and relatively fast velocities of combustion gas flow. In the case of piston 48 and other pistons according to the present disclosure, combustion gases can be expected to flow around the central step in the valve pockets as well as flowing over and across the central step. Providing an obstruction or throttling of the flow area initially, as plumes of combustion gases advance outward of the combustion bowl, but then a relatively enlarged flow area as the combustion gases pass over the central step and begin to advance toward the outer peripheral surface of the piston, is believed to enable a deceleration in the flow speed. As a result the speed of combustion gas flow tends to be less than what could otherwise be expected to lead to displacement and/or evaporation of an oil film on the inner wall of the cylinder liner and/or an extent of displacement or evaporation that is not compensated for by oil provision in-service. The disclosed ratios and ranges herein are expected to provide practical applications where the influence on gas flow is at least sufficient to address oil film displacement and/or evaporation, but not so much as to unduly restrict or otherwise modify flow in a manner affecting other combustion objectives.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine comprising:
a cylinder block having a cylinder liner positioned therein and forming a combustion cylinder;
a cylinder head having a gas exchange conduit formed therein;
a fuel injector supported in the cylinder head and including fuel spray orifices positioned within the combustion cylinder;
an engine valve supported for reciprocation in the cylinder head and movable from a closed position to an open position to fluidly connect the gas exchange conduit to the combustion cylinder;
a piston positioned in the combustion cylinder and movable between a bottom dead center position and a top dead center position to increase a fluid pressure in the combustion cylinder to an autoignition threshold;
the piston including a piston crown having a bowl surface forming a combustion bowl and a piston rim positioned radially outward of the combustion bowl and extending circumferentially around a piston center axis;
a valve pocket is formed in the piston rim and positioned to receive the engine valve when the engine valve is at the open position; and
the valve pocket forming a fluid flow path through the piston rim and including a valve pocket floor, and a central step standing proud of the valve pocket floor and positioned in the fluid flow path to slow combustion gas flow from the combustion bowl toward the cylinder liner.

2. The engine of claim 1 wherein the valve pocket further includes a first pocket wall and a second pocket wall having mirror image contours each formed by a radially inward concave wall segment and a radially outward wall segment.

3. The engine of claim 2 wherein the piston crown includes an outer peripheral surface, and the radially outward wall segments are convex and together form a throat opening at the outer peripheral surface.

4. The engine of claim 2 wherein:
the first pocket wall and the second pocket wall define an outer circle, and the central step includes an outer step wall defining an inner circle that is concentric with the outer circle; and
a diameter of the inner circle is from about 39% to about 80% of a diameter of the outer circle.

5. The engine of claim 4 wherein:
the first pocket wall intersects the pocket floor at a first contour line and the second pocket wall intersects the pocket floor at a second contour line, and the outer step wall intersects the pocket floor at a third contour line; and
the first contour line and the second contour line form arc segments of the outer circle, and the third contour line forms an arc segment of the inner circle.

6. The engine of claim 1 wherein:
the engine valve incudes a valve head having a seating surface, and a combustion face; and
the combustion face is formed in part by a concave arcuate surface forming a centrally located dimple, and a raised ring extending circumferentially around the dimple and received within the valve pocket when the piston is at the top dead center position.

7. A piston for an internal combustion engine comprising:
a piston body including a piston skirt, and a piston crown attached to the piston skirt;
the piston crown having a bowl surface forming a combustion bowl, and a piston rim positioned radially outward of the combustion bowl and extending circumferentially around a piston center axis and radially between the combustion bowl and a piston crown outer peripheral surface;
a plurality of valve pockets are formed in the piston rim;
the plurality of valve pockets forming fluid flow paths through the piston rim, and each including a valve pocket floor, valve pocket walls extending between the combustion bowl and the outer peripheral surface, and a central step; and
the central step stands proud of the valve pocket floor and is positioned within the respective fluid flow path and includes an inner step wall, and an outer step wall spaced from the valve pocket walls and from the piston crown outer peripheral surface.

8. The piston of claim 7 wherein the pocket walls in each of the plurality of valve pockets include a first pocket wall and a second pocket wall defining an outer circle, and the respective outer step wall defines an inner circle that is concentric with the outer circle.

9. The piston of claim 8 wherein:
the first pocket wall intersects the pocket floor at a first contour line and the second pocket wall intersects the pocket floor at a second contour line, and the outer step wall intersects the pocket floor at a third contour line; and
the first contour line and the second contour line form arc segments of the outer circle, and the third contour line forms an arc segment of the inner circle.

10. The piston of claim 9 wherein a diameter of the inner circle is from about 39% to about 80% of a diameter of the outer circle.

11. The piston of claim 10 wherein the diameter of the inner circle is from 60% to 64% of the diameter of the outer circle.

12. The piston of claim 10 wherein the diameter of the inner circle is from 39% to 43% of the diameter of the outer circle.

13. The piston of claim 10 wherein the valve pocket floor is planar from the third contour line to each of the first contour line and the second contour line.

14. The piston of claim 9 wherein the valve pocket floor includes an inner planar region bounded by the third contour line, an outer planar region bounded by the first contour line and the second contour line, and a downward sloping region extending between the inner planar region and the outer planar region.

15. The piston of claim 8 wherein a stepless valve pocket is formed in the piston rim.

16. The piston of claim 8 wherein the plurality of valve pockets includes a first valve pocket and a second valve pocket, and each of a pocket width and a central step width of the first valve pocket is greater than a pocket width and a central step width of the second valve pocket.

17. A piston crown for a piston in an internal combustion engine comprising:
- a piston crown body defining a piston center axis extending between a first piston axial end, and a second piston axial end including a combustion face;
- the combustion face including a bowl surface forming a combustion bowl, and a piston rim positioned radially outward of the combustion bowl and extending circumferentially around the piston center axis and radially between the combustion bowl and a piston crown outer peripheral surface;
- a plurality of valve pockets are formed in the piston rim and distributed circumferentially around the piston center axis, to receive a plurality of engine valves in the internal combustion engine;
- the plurality of valve pockets forming fluid flow paths through the piston rim, and each including a valve pocket floor, and valve pocket walls extending between the combustion bowl and the outer peripheral surface;
- at least one of the plurality of valve pockets further including a central step positioned within the respective fluid flow path;
- the central step stands proud of the valve pocket floor and includes a step top surface recessed relative to the piston rim, and the central step further includes an inner step wall adjacent to the combustion bowl, and an outer step wall spaced from the valve pocket walls and from the piston crown outer peripheral surface.

18. The piston crown of claim 17 wherein:
- the valve pocket walls include a first pocket wall and a second pocket wall defining an outer circle;
- the outer step wall defines an inner circle that is concentric with the outer circle; and
- a diameter of the inner circle is from about 39% to about 80% of a diameter of the outer circle.

19. The piston crown of claim 18 wherein:
- the pocket floor is planar from the third contour line to each of the first contour line and the second contour line; and
- the diameter of the inner circle is from 60% to 64% of the diameter of the outer circle.

20. The piston crown of claim 18 wherein:
- the pocket floor includes an inner planar region bounded by the third contour line, an outer planar region bounded by the first contour line and the second contour line, and a downward sloping region extending between the inner planar region and the outer planar region; and
- the diameter of the inner circle is from 39% to 43% of the diameter of the outer circle.

* * * * *